No. 854,199. PATENTED MAY 21, 1907.
F. L. DYER & D. HOLDEN.
EXHIBITING APPARATUS FOR MOVING PICTURES.
APPLICATION FILED NOV. 22, 1905.
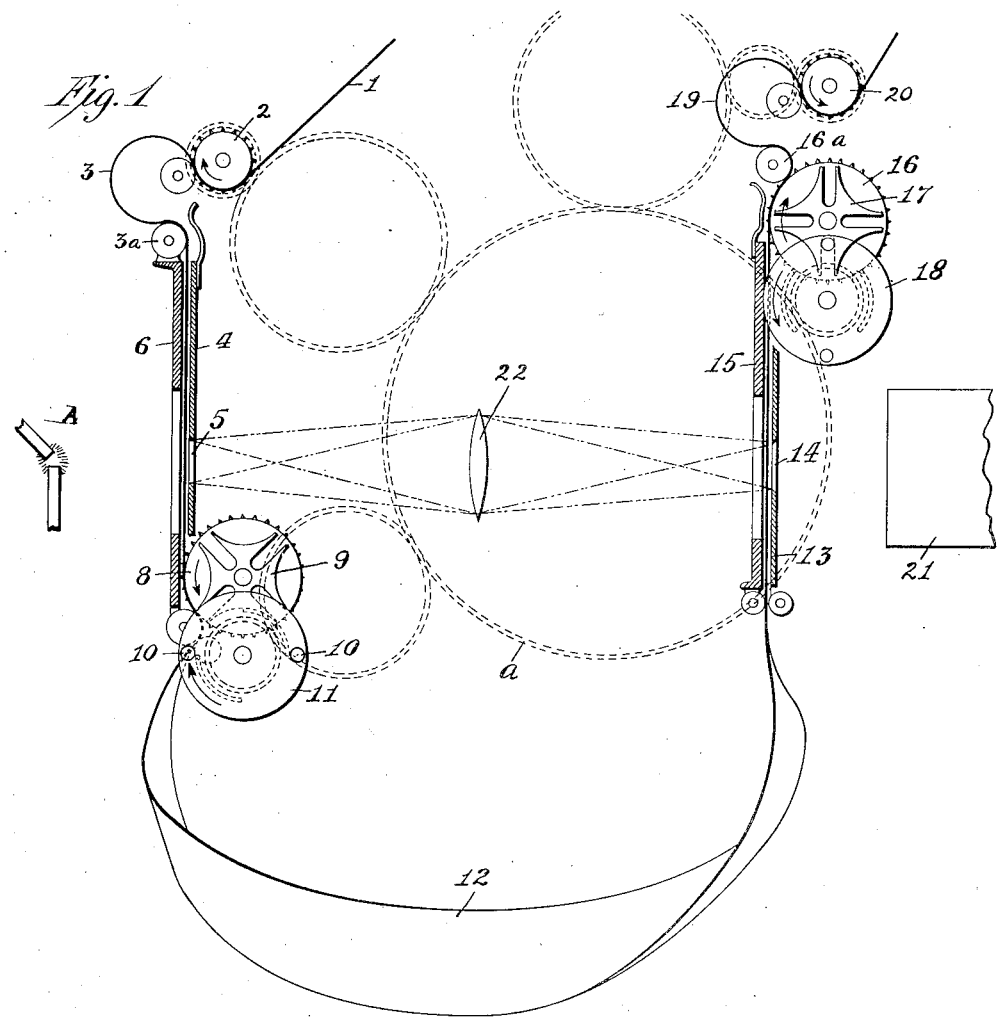
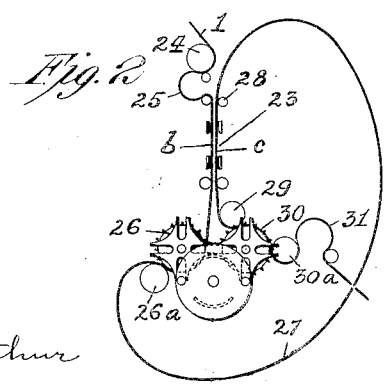
Witnesses: Inventors

UNITED STATES PATENT OFFICE.

FRANK L. DYER, OF MONTCLAIR, AND DELOS HOLDEN, OF ORANGE, NEW JERSEY, ASSIGNORS TO EDISON MANUFACTURING COMPANY, OF WEST ORANGE, NEW JERSEY, A CORPORATION OF NEW JERSEY.

EXHIBITING APPARATUS FOR MOVING PICTURES.

No. 854,199.    Specification of Letters Patent.    Patented May 21, 1907.

Application filed November 22, 1905. Serial No. 288,514.

*To all whom it may concern:*

Be it known that we, FRANK L. DYER, a citizen of the United States, and a resident of Montclair, in the county of Essex and State of New Jersey, and DELOS HOLDEN, a citizen of the United States, and a resident of Orange, in the county of Essex and State of New Jersey, have invented a certain new and useful Exhibiting Apparatus for Moving Pictures, of which the following is a description.

Our invention relates to an improved apparatus for exhibiting moving pictures of the type disclosed in our application filed October 21, 1905, Serial No. 283,838, wherein the photographs are arranged in two arithmetical series, representing successive phases of movement, the members of the two series alternating and the photographs of the one series being preceded by photographs of the other series which are representative of later phases of movement. By thus arranging the photographs it becomes possible to exhibit a photograph of one series, while the succeeding photograph of the other series is being moved into position to be exhibited, whereby a continuous effect is produced somewhat analogous to the exhibition of so-called "dissolving views".

Our object is to provide a simple and cheap apparatus by which moving pictures of this type may be effectively exhibited by the use of a single source of light and a single objective and preferably without any reflection of the beam of light during its passage through the apparatus. Broadly stated, the invention comprises an apparatus capable of passing the film twice through the same beam of light either at separate display openings which are situated at conjugate foci of a lens, or across a single opening in such a manner that the pictures which are to be exhibited lie in substantially the same focal plane so that they will be accurately focused by the projecting lens on the screen. In other words, the film passes through the apparatus in such a manner that the light at all times passes through two thicknesses of the film, and if these two parts of the film were held stationary the images of the two pictures which are superimposed would unite on the screen as a single picture. In order to produce a continuous effect, however, the apparatus is so designed that one thickness of the film is moving while the other is at rest, and vice versa, the film driving or feeding mechanism being so arranged that the period of movement of each thickness of the film is preferably exactly equal to its period of rest, and the periods of rest of the two thicknesses alternate, so that the instant one thickness has been brought to rest the other thickness begins to move, although the periods of rest may be slightly longer than the periods of movement, if desired. Consequently there will always be a stationary image upon the screen and there will also be an image traveling across the screen with very great rapidity, so rapidly that it cannot be apprehended by the eye, and does not interfere with the stationary image. Furthermore, as the films are composed of transparent material the light easily passes through both thicknesses of the film and the moving portion does not in any way cut off the light passing to or from the portion at rest, because the moving portion allows light to pass almost as freely as if there were no film interposed. Since no shutter is used the amount of light passing through the objective is practically constant, and there is no flickering upon the screen.

Reference is hereby made to the accompanying drawing in which

Figure 1 is a side elevation partly in section of an apparatus embodying our invention in its preferred form and Fig. 2 is a diagrammatic view of a modification thereof.

Referring to Fig. 1 in which the path of the light is from left to right from the source of light A through the apparatus, the film 1 having the usual rows of perforations along its edges, passes first from its supply reel around a continuously operated feed sprocket 2 forming a loop 3 and passing thence over the idler 3ª and down between the fixed plate 4 having a display opening 5 and the usual holding plate or gate 6 which is pivoted at one side to allow the film to be threaded through the apparatus. Below the opening 5 is an intermittent feed sprocket 8 which is rigid with the star wheel 9 which is intermittently moved by the pins 10 of the disk 11 in the well known manner, the said disk being continuously driven by a gear train operated by the large drive gear $a$. The sprocket 8 at every movement moves the film a distance equal to the length of two adjacent pictures, so as to expose every other picture at the opening 5, and the parts are so designed that the periods of rest are exactly equal to the periods of movement. After leaving the sprocket 8 the film forms a loop 12 and passes thence between the fixed plate 13 having a display opening 14 and a holding plate 15 hinged at one side. An intermittent feed sprocket 16 engages the film above the opening 14, the said sprocket being operated by a star wheel 17 and pin disk 18 driven from the gear $a$. This sprocket also feeds the film the length of two pictures at every movement, and the periods of movement exactly equal the periods of rest. Furthermore the period of movement of the sprocket 16 exactly coincides with the period of rest of the sprocket 8 and vice versa. The film then passes over an idler $16^a$ forming a loop 19 and thence over a continuously operated sprocket 20 to the usual takeup reel. The display openings 5 and 14 are in optical alinement with each other and with the objective or projecting lens 21 of the usual type. Exactly midway between the openings 5 and 14 is situated a lens 22 so designed that the openings 5 and 14 are at congugate foci, whereby a picture located at 14 will exactly coincide in size and position with the image which will be formed by the lens 22 of a picture located at the opening 5. Since such image will be inverted, it is necessary that that portion of the film forming the loop 12 shall be given a twist as shown, so that the edge which is at the right of the apparatus at the opening 5 will be at the left of the apparatus at the opening 14. The plates 4, 13, lens 22, and objective 21 will be carried by a heavy frame rigid enough to preserve the proper optical relations of these parts, and the film driving and feeding mechanism may be carried on a separate frame vertically adjustable with respect to the optical frame.

The operation of the device is as follows: The film being at rest at the display opening 5, the picture at said opening is brilliantly illuminated in the usual manner and the pencils of light formed by the various points of the picture pass through the lens 22, and form an inverted image at the opening 14. The portion of the film at this point is during this period being rapidly moved by the intermittent sprocket 16, and on account of the transparent character of the film and its rapid motion, the formation of the said image is not interfered with, and the light passes on freely into the objective 21 by which it is projected on a screen in the usual manner, or observed directly by the eye through a suitable eye piece. As soon as the sprocket 16 allows the portion of the film which is opposite the display opening 14 to come to rest, the sprocket 8 begins to move the portion of the film which is opposite the display opening 5. During this period the source of light sends a powerful beam of light through the moving film and opening 5 upon the lens 22 which condenses the same upon the film at the opening 14, and since the part of the film at 5 is transparent and moving rapidly, the intensity of this beam of light will be sufficiently strong to brilliantly illuminate the picture opposite the opening 14 so that it may be projected by the projecting lens 21 or observed by an eye piece. The film then comes to rest again at 5 and the sequence of operations is repeated, the pictures of only one arithmetical series being brought to rest at one opening and only those of the other series at the other opening. The result is that the observer sees a stationary image at all times, since the movement of one part of the film does not take place until the period of movement of the other part has ended. The stationary image holds the eye and the rapidly moving image which crosses the stationary image is not observed. The film will be driven through the apparatus at such a rate of speed as to produce lifelike movements of the objects portrayed in the photographs carried by the film.

In the apparatus of Fig. 2, a single display opening 23 is provided. The film 1 passes around the continuously operated sprocket 24 forming a loop 25; thence across the display opening 23 to the intermittent sprocket 26; thence over the idler $26^a$ to the loop 27; thence over an idler 28 and again across the display opening 23; thence over an idler 29 to the intermittent sprocket 30; thence over an idler $30^a$ forming a loop 31 and thence to the takeup reel. The thickness $b$ of the film is at rest during all the time that the thickness $c$ is moving and vice versa. For clearness, the thicknesses $b$ and $c$ are shown separated by a space, but in practice the two thicknesses will be in close contact with each other. In order that the photographs of the two arithmetical series may lie in the same focal plane with respect to the objective 21, the photographs of one series may be printed upon one face of the film and the photographs of the other series upon the opposite face of the film so that the photographs of the thickness $b$ which are brought to rest will be on the face toward the objective and those of the thickness $c$ which are brought to rest will be on the face which is farthest from the objective and the pictures will be so applied to the film that at the instant $b$ and $c$ are both stationary, all features which are common to the two will register with each other.

Having now described our invention, what we claim as new and desire to secure by Letters Patent is as follows:

1. In a moving picture exhibiting apparatus, the combination with a source of light, of means for intermittently passing a continuous strip through the path of the light in such a manner that two portions of the strip register with each other in said path and come to rest in alternation, substantially as set forth.

2. In a moving picture exhibiting apparatus, the combination with a source of light, of means for intermittently passing a continuous strip through the path of the light in such a manner that two portions of the strip register with each other in said path and come to rest in alternation, said means operating in such a manner that the period of movement of one portion occurs during the period of rest of the other portion, substantially as set forth.

3. In a moving picture exhibiting apparatus, the combination with a source of light, of means for intermittently passing a continuous strip through the path of the light in such a manner that two portions of the strip register with each other in said path and come to rest in alternation, the periods of movement and rest being approximately equal, substantially as set forth.

4. In a picture exhibiting apparatus, the combination with a source of light and an objective, of a pair of display openings situated in optical alinement with each other in the path of said light and at substantially different distances from said objective, substantially as set forth.

5. In a picture exhibiting apparatus, the combination of a source of light, a lens one or more frames or casings formed with a pair of display openings situated at conjugate foci of said lens and means for passing a film across said display openings, substantially as set forth.

6. In a moving picture exhibiting apparatus, the combination with a source of light, of one or more frames or casings formed with a pair of display openings situated in alinement with respect to the path of the light and means for passing a continuous strip across each of said openings, substantially as set forth.

7. In a moving picture exhibiting apparatus, the combination with a source of light, of one or more frames or casings formed with a pair of display openings situated in alinement with respect to the path of the light and means for intermittently passing a continuous strip across each of said openings, substantially as set forth.

8. In a moving picture exhibiting apparatus, the combination with a source of light, of one or more frames or casings formed with a pair of display openings situated in alinement with respect to the path of the light, and means for intermittently passing a continuous strip across each of said openings, the periods of movement at one opening occurring during the periods of rest at the other opening, substantially as set forth.

9. In a moving picture exhibiting apparatus, the combination with a source of light, of one or more frames or casings formed with a pair of display openings situated in alinement with respect to the path of the light and means for intermittently passing a continuous strip across each of said openings, the periods of rest being equal to or greater than the periods of movement, substantially as set forth.

10. In a picture exhibiting apparatus, the combination of one or more frames or casings formed with a pair of optically alined display openings and means for intermittently moving a continuous strip across said openings in such a manner that the period of movement at one opening occurs during the period of rest at the other opening, substantially as set forth.

11. In a picture exhibiting apparatus, the combination of a long flexible strip carrying two series of pictures the members of which alternate, one or more frames of casings formed with a pair of optically alined display openings and means for intermittently moving said strip across said openings, the intermittent feed operating to move the strip at each step a distance equal to the length of the two adjacent pictures, whereby the pictures of only one series will be displayed at each opening, substantially as set forth.

12. In a picture exhibiting apparatus, the combination of a long flexible strip carrying two series of pictures the members of which alternate, one or more frames or casings formed with a pair of optically alined display openings, and means for intermittently moving said strip across said openings, the intermittent feed operating to move the strip at each opening in alternation a distance equal to the length of two adjacent pictures, whereby the pictures of the two series will be at rest successively and in alternation at their respective openings, substantially as set forth.

13. In a picture exhibiting apparatus, the combination of a long strip carrying two series of pictures representing rapidly succeeding positions of objects in motion, the members of which series alternate, one or more frames or casings formed with a pair of optically alined display openings and means for intermittently moving said strip across said openings, the intermittent feed operating to move the strip at each opening in alternation a distance equal to the length of the two adjacent pictures, whereby the pictures of the two series will be at rest successively and in alternation at their respective openings, substantially as set forth.

14. In a picture exhibiting apparatus, the combination of a source of light, a long flexible strip carrying two series of pictures the members of which alternate, and means for successively bringing to rest in the same focal plane as the pictures of one series, images of the pictures of the other series, substantially as set forth.

This specification signed and witnessed this 21st day of November, 1905.

FRANK L. DYER.
DELOS HOLDEN.

Witnesses:
J. F. RANDOLPH,
MINO C. MACARTHUR.